United States Patent [19]

Ramun

[11] Patent Number: 4,897,921
[45] Date of Patent: Feb. 6, 1990

[54] METAL CUTTING SHEAR WITH CHANGEABLE MULTIPLE CUTTING EDGE PORTIONS

[75] Inventor: John R. Ramun, Youngstown, Ohio
[73] Assignee: Allied Gator Inc., Youngstown, Ohio
[21] Appl. No.: 228,104
[22] Filed: Aug. 4, 1988
[51] Int. Cl.⁴ .............................................. B23P 19/00
[52] U.S. Cl. ...................................... 30/134; 30/228; 414/740
[58] Field of Search .................. 30/134, 225, 414, 30; 83/609

[56] References Cited
U.S. PATENT DOCUMENTS
4,403,431  9/1983  Ramul et al. ........................... 30/134

Primary Examiner—Frank T. Yost
Assistant Examiner—Willmon Fridie, Jr.
Attorney, Agent, or Firm—Harpman & Harpman

[57] ABSTRACT

A material handling and metal shear attachment for a backhoe is mounted on the boom or dip stick of the backhoe for actuation by the hydraulic system of the backhoe. A fixed blade is pivotally secured to the boom or dip stick and a movable cutting blade is pivoted to the fixed blade. A hydraulic piston and cylinder assembly mounted on the fixed blade moves the movable cutting blade in shearing relation to the fixed blade. The fixed and movable blades are shaped and positioned relative to their pivotal engagement to move objects being sheared toward the blade's pivotal engagement where the cutting force is the greatest. The movable blade and the fixed blade have changeable cutting edge portions, each of the portions having a number of cutting edges on both sides so that worn cutting edge sections are replaced quickly and easily by changing the position of the cutting edge portion relative to the movable and fixed blades on which they are positioned.

10 Claims, 3 Drawing Sheets

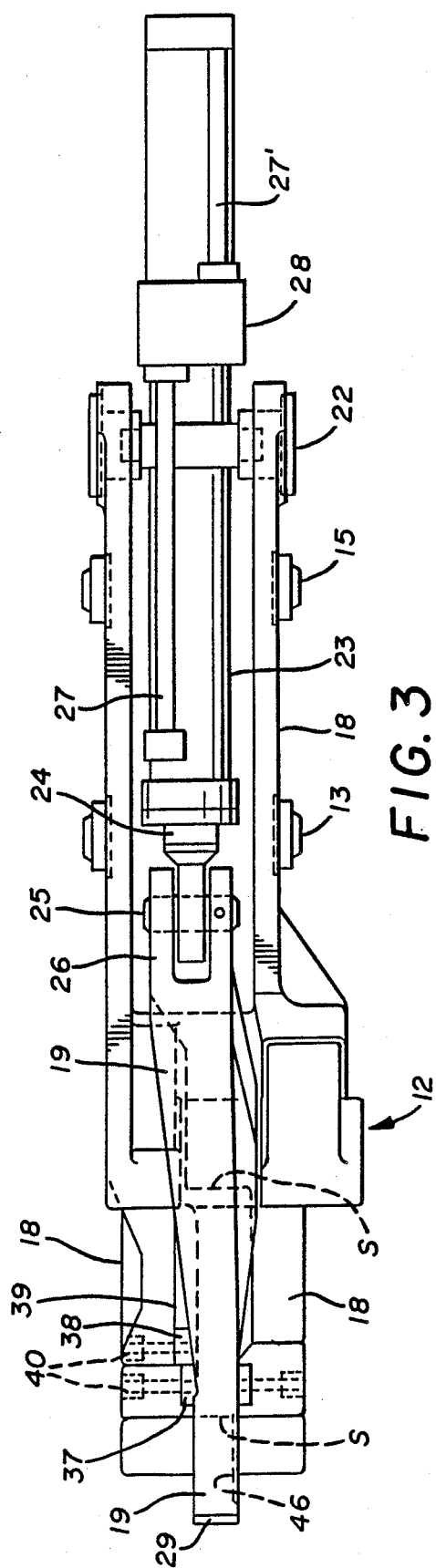
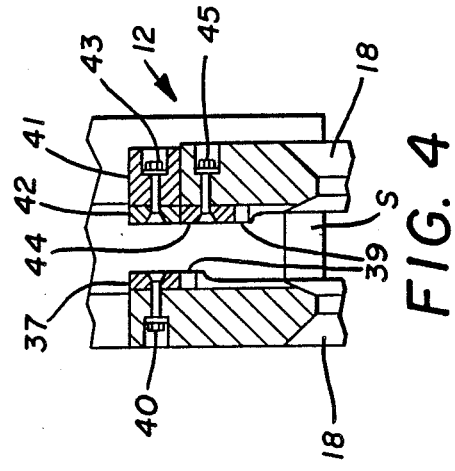
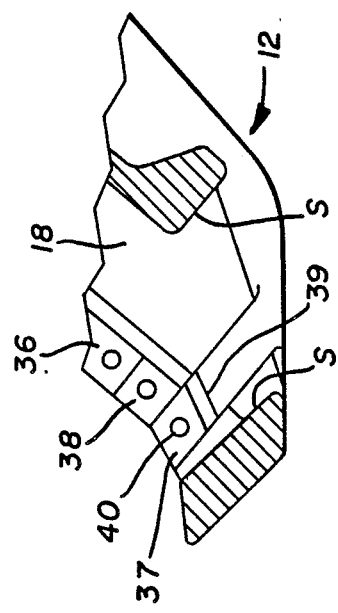
FIG. 3
FIG. 4
FIG. 5

METAL CUTTING SHEAR WITH CHANGEABLE MULTIPLE CUTTING EDGE PORTIONS

BACKGROUND OF THE INVENTION

1. Field of the Invention:

This invention relates to heavy duty shears of the type that are mounted on backhoes and powered by hydraulic cylinders for the efficient handling of scrap and especially metal scrap and shearing the same into reuseable scrap sizes. Metal scrap from industrial buildings being dismantled occurs in many different forms and sizes from pipes of various diameters and lengths to structural beams such as I-beams, channels, angles, and the like and metal sheets and plates and various automobile and truck frames, railroad cars and the like and wherein the shear must be able to pick up, move and cut the metal pieces regardless of size or shape and without any wedging or binding action of the work pieces relative to the shears.

2. Description of the Prior Art:

Prior devices of this type are best represented by our U.S. Pat. Nos. 4,670,983 and 4,686,767. Other prior art is represented by U.S. Pat. Nos. 4,376,340, Ramun, et al., 4,403,431, Ramun, et al., 4,439,921, Ramun, et al., 4,450,625, Ramun et al., 4,519,135, LaBounty, 4,543,719, Pardoe and 4,558,515, LaBounty.

In the inventions disclosed in U.S. Pat. Nos. 4,670,983 and 4,686,767, Ramun, et al., metal cutting shears of substantially the same configuration as the shear of the present invention are disclosed. The patentable improvement comprising the present invention relates to the cutting edge portions attached to the fixed and movable blades of the shears. For example in the '983 patent, the fixed blade has an elongated hardened cutting edge portion 43 located inwardly of a pair of spaced upstanding guides 45 on a first outermost end of the fixed cast steel blade 22. The shear also has adjustable wear plates 44 positioned on the other one of the guides 45 and one of the guides 45 is pointed and sharpened for metal shearing engagement with all of the three hardened cutting portions 37, 38 and 39 of the movable blade 23 of the shear disclosed in the '983 patent.

In the present invention, the pointed and sharpened guide 45 remains in reduced width and a pair of substantially diamond-shaped changeable multiple cutting edge portions are positioned adjacent thereto to form the actual cutting edge portions of the fixed blade. Similarly, the pointed cutting end portion 37 and the cutting edge portions 38 and 39 of the movable blade of the shear of the '983 patent remain with the elongated cutting edge portion 38 being replaced by a pair of cutting edge portions, one of which is square in plan view, the other being rectangular. The square cutting edge portion is formed with eight cutting edges, four on each side, defining its peripheral edges and it is mounted for quick and easy positioning so that when one of the multiple cutting edges is worn, it may be partially removed and turned to bring a new cutting edge portion into alignment with the cutting edge of the fixed movable blade.

SUMMARY OF THE INVENTION

The metal cutting shear with changeable multiple cutting edge portions a fixed blade having a movable blade pivoted thereto, the fixed blade being pivotally mounted on the end of a boom or dip stick of a back hoe in place of the normal bucket. A piston and cylinder on the boom of the backhoe engages the fixed blade so as to impart pivotal motion thereto and a second piston and cylinder on the fixed blade engages the movable blade so as to move it in a shearing relation with respect to the fixed blade. Both blades are unitary cast steel and have detachable hardened cutting bars and changeable multiple cutting edge portions forming continuations of the hardened cutting bars. The fixed blade has an open slot therein that forms means for confining the movable blade to a path alongside the fixed blade where it will operate to move objects being sheared toward the blades pivotal engagement rather than away therefrom when it is moved by the hydraulic piston and cylinder. The changeable multiple cutting edge portions are positioned on the opposite sides of the open slot for shearing and guiding registry with the movable blade when the same is moved into the open slot to bring the hardened cutting bars and the changeable multiple cutting edge portions into shearing engagement with a work piece.

DESCRIPTION OF THE DRAWINGS

FIG. 3 is a top plan view of the shear seen in FIG. 1;

FIG. 4 is an enlarged cross section on line 4—4 of FIG. 1;

FIG. 5 is a cross section on line 5—5 of FIG. 2;

DESCRIPTION OF THE PREFERRED EMBODIMENT

Backhoes such as used in industry are powered machines having an extensible boom and hydraulic controlled piston and cylinders mounted thereon. A dip stick is normally pivotally attached to the boom and a bucket is normally attached to the end of the dip stick and is moved by one or more hydraulic piston and cylinder assemblies comprising part of the hydraulic system of the backhoe.

The present invention is an improvement in an attachment for a backhoe that is used in place of the bucket for handling, shearing and moving structural beams, pipes, cables and other structural members and the like normally found in structures being dismantled.

Figure 1:
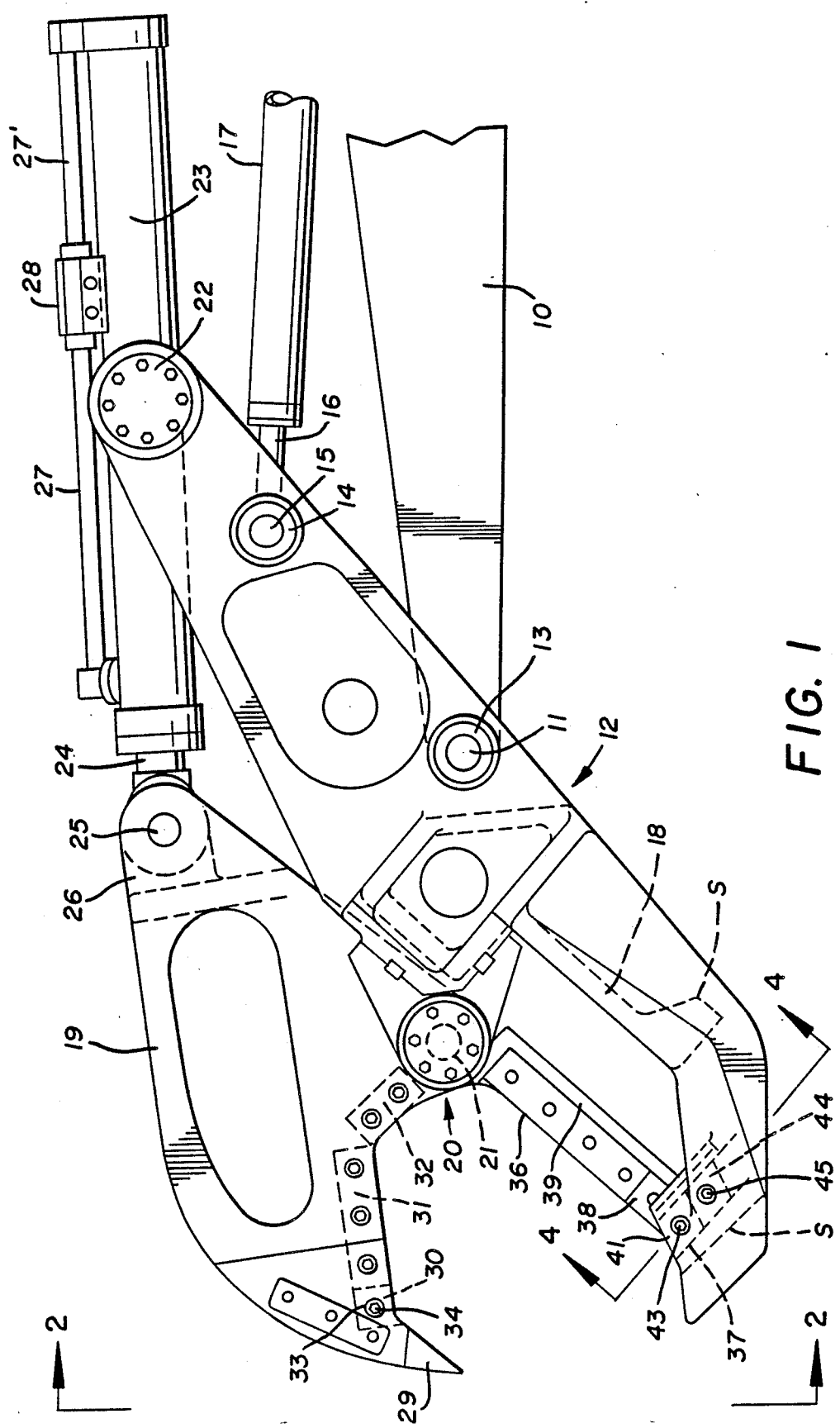
FIG. 1 is a side elevation of the metal cutting shear with changeable multiple cutting edge portions mounted on the boom or dip stick of a backhoe.

By referring to FIG. 1 of the drawings, a backhoe boom or dip stick 10 has a mounting pin 11 positioned therethrough near its outer end so as to pivotally support a fixed blade 12 having bushings 13 engaged on the mounting pin 11. Secondary bushings 14 on the fixed blade 12 engage a secondary pin 15 on a piston rod 16 of a piston and cylinder assemble 17, the cylinder of which is pivotally attached to the boom or dip stick 10 in a pivotal manner, not shown. The fixed blade 12 is a unitary cast steel structure having parallel beams 18 in one portion thereof. A single unitary cast steel movable blade 19 is pivotally engaged on the fixed blade 12 by an adjustable shaft and thrust bearing arrangement located at 20 in FIG. 1 of the drawings and wherein a shaft 21 is positioned transversely in the movable blade 19 in bushings and against thrust bearings as disclosed in the aforesaid U.S. Pat. Nos. 4,670,983 and 4,686,767.

Figure 2:
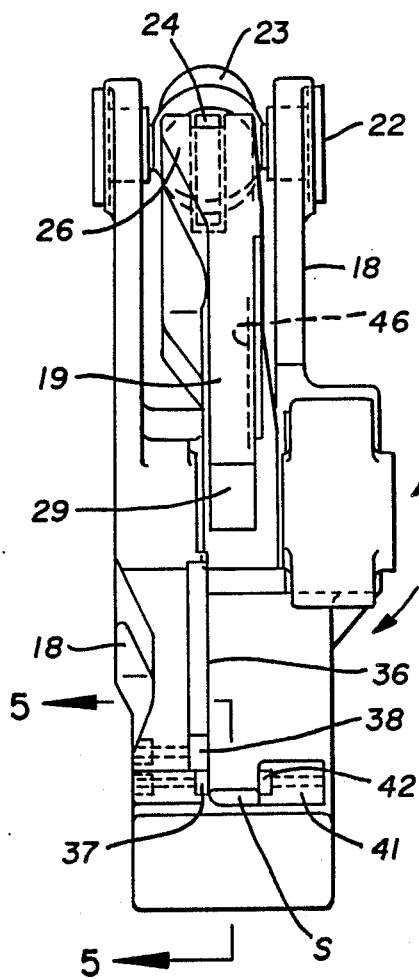
FIG. 2 is an end elevation of the shear seen in FIG. 1.

By referring now to FIGS. 1,2 and 3 of the drawings, it will be seen that the fixed blade 12 is elongated and is secured inwardly of its ends to the mounting pins 11 and 15 of the boom 10 and piston rod 16 respectively by the horizontally spaced bushings 13 and 14 respectively. The beams 18 of the fixed blade 12 carry a bifurcated bearing assembly 22 which pivotally positions a second hydraulic piston and cylinder assembly 23 between the spaced beams 18 of the fixed blade 12, the piston rod 24 of which is pivotally engaged on a transverse pin 25 in a bifurcated end 26 of the movable blade 19. Tubes 27 and 27' respectively, communicate with the opposite ends of the hydraulic cylinder 23 and a central fitting 28 to which hydraulic fluid is selectively delivered by the hydraulic system of the backhoe on which the device is installed.

Still referring to FIGS. 1,2 and 3 of the drawings, it will be seen that the movable blade 19 is of generally hook-shape and has a replaceable hardened cutting end portion 29 on its free end and first, second, and third hardened cutting edge portions 30, 31, and 32 which are positioned on sections of the movable blade 19, two of which are angularly disposed with respect to one another at an angle of approximately 60° and one of which, the cutting edge portion 30, is positioned alongside and on a common plane with the second cutting edge portion 31. The portion 30 is changeable.

Figure 6:
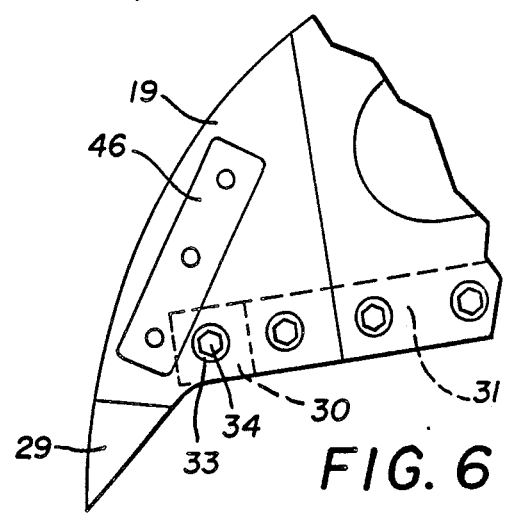
FIG. 6 is an enlarged detail of a portion of the movable blade of FIG. 1.
Figure 7:
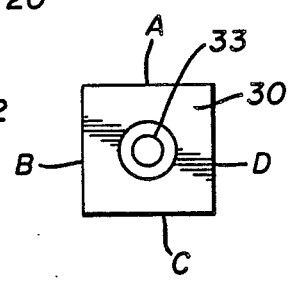
FIG. 7 is a plan view of a changeable multiple cutting edge portion seen in FIG. 6.
Figure 8:
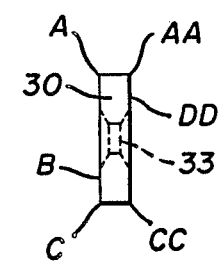
FIG. 8 is an end view of the multiple cutting edge portion of FIG. 7.

By referring to FIG. 6 of the drawings, an enlarged detail of the outer end portion of the movable cutting blade 19 may be seen with the changeable multiple cutting edge portion 30 in position thereon, and in FIGS. 7 and 8 of the drawings, this changeable multiple cutting edge portion 30 will be seen in plan view and edge elevation respectively. The changeable multiple cutting edge portion 30 is centrally apertured at 33 and it is formed of hardened steel so as to form four cutting edges on each of its two sides. In FIG. 7 of the drawings, the four cutting edges on the side of the portion 30 shown in plan view are indicated at A,B,C and D and in FIG. 8, which is an edge or end view of the portion 30, illustrates three of the four cutting edges A,B, and C on one side of the portion 30 and three of the cutting edges AA,DD, and CC on the other side of the portion 30, it being observed that the cutting edges B and D illustrated in FIG. 7 are duplicated on the opposite side thereof as vertical lines directly behind the cutting edges B and D.

The changeable multiple cutting edge portion 30 therefore has eight effective cutting edges and it is of square plan shape and it is positioned in a recess formed on the side of the movable blade 19 by appropriate structure so that the changeable multiple cutting edge portion 30 when attached to the movable blade 19 forms a fixed, effective changeable cutting edge portion thereon along with the hardened cutting bars 31 and 32.

Still referring to FIGS. 1 and 6 of the drawings, it will be seen that the aperture 33 in the changeable multiple cutting edge portion 30 is enlarged on each side thereof so that a fastener such as a bolt 34 can be positioned therethrough and through a matching opening in the movable cutting blade 19 while maintaining the flush outer surfaces of the portion 30.

By referring now to FIGS. 1,2,3,5 and 9 of the drawings, it will be seen that the unitary cast steel fixed blade 12 has a raised hardened cutting edge portion 36 secured thereto by a plurality of fasteners, the raised hardened cutting edge portion 36 being located inwardly of a pair of secondary changeable cutting edge portions 37 and 38 as best seen in FIGS. 1 and 5 of the drawings. The changeable cutting edge portions 37 and 38, which are of suitable thickness, are of different shapes and both have multiple cutting edges like the hereinbefore described changeable multiple cutting edge portion 30, and with the cutting edge portion 36 form a continuous cutting edge on the fixed blade 12 which registers with the hardened cutting edge portion 29, the changeable multiple cutting edge portion 30, and the hardened cutting edge portions 31 and 32 on the angularly disposed sections of the movable blade 19.

By referring to FIGS. 4 and 5 of the drawings, it will be seen that the secondary changeable multiple cutting edge portion 37 and the changeable multiple cutting edge portion 38 are supported by a ledge 39 on the beam 18 and secured to the beam 18 by fasteners 40. The other beam 18 has a permanently attached upstanding semi-rigid triangular body member 41 in oppositely disposed relation to the secondary changeable multiple cutting edge portion 37 on the opposite beam 18 and positions a changeable multiple edge wear plate 42 by means of a fastener 43. A duplicate changeable multiple edge wear plate 44 is positioned immediately under the changeable multiple edge wear plate 42 and is attached directly to the horizontal beam 18 by a fastener 45.

Figure 10:
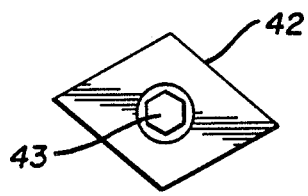
FIG. 10 is a plan view of one of the multiple cutting edge portions seen in FIG. 9.
Figure 9:
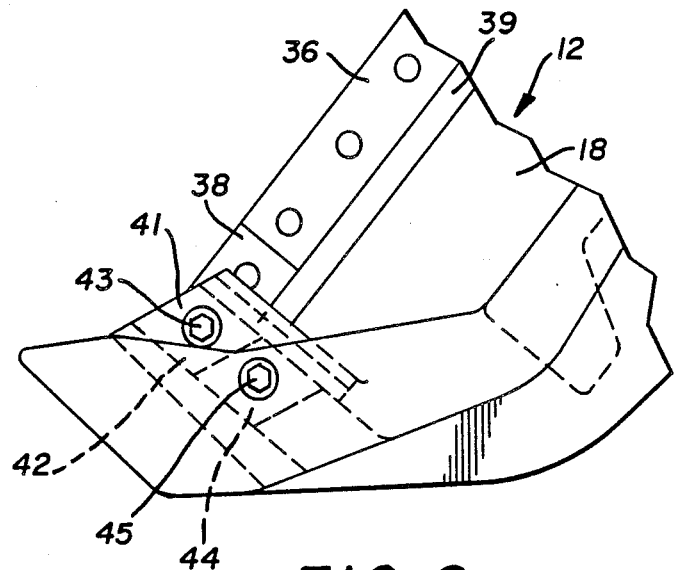
FIG. 9 is an enlarged detail of a portion of the fixed blade of FIG. 1 showing the changeable multiple cutting edge portions.

By referring to FIGS. 5,9 and 10 in particular, it will be seen that the changeable multiple edge wear plates 42 and 44 are generally diamond-shaped (see the plan view of FIG. 10), they are centrally apertured and the apertures are counter sunk or otherwise shaped to form appropriate recesses for the heads of the fasteners 43 and 45 which are positioned therethrough and which upon being removed permit the changeable multiple edge wear plates 42 and 44 to be rotated so that the four edges on each of the sides of the portion 37 may be sequentially positioned in uppermost wearing location.

Still referring to FIGS. 5 and 9 of the drawings, it will be seen that the intermediate changeable multiple cutting edge portion 38, which is also centrally apertured and removably affixed to the beam 18 also presents four cutting edges on each of its two sides so that it may be removed, partially rotated and replaced and thereby provide eight cutting edges in the same manner as the changeable multiple cutting edge portion 30 on the movable blade 19 as hereinbefore described.

As shown in FIGS. 1 and 6 of the drawings, a wear plate 46 is positioned on the side of the movable blade 19 that slidably engages the changeable multiple edge and surface wear plates 42 and 44.

The wear plate 46 is angularly positioned on the side of the movable blade 19 so that when the movable blade 19 is moved relative to the fixed blade 12 in a shearing action, the wear plate 46 will initially engage the wear plate 42 and then simultaneously engage the wear plate 42 and the wear plate 44 as they are disposed on substantially the same angle as the wear plate 46 as it slides thereby. This arrangement of the respective wear plates increases the contacting surfaces of the movable blade 19 and the fixed blade 12 and insures the retention of the movable blade 19 in a desirable common shearing plane with respect to the fixed blade 12. This action is further enhanced by the formation of the shearing edge and side of the movable blade 19 so that it is positioned on the center line of the piston rod 24 of the piston and cylinder assembly 23 and its pivotal engagement on the transverse pin 25 in the bifurcated end 26 of the movable blade 19. This construction and formation of the movable blade 19 and its movement imparting means is best illustrated in the end view of FIG. 2 and the top plan view of FIG. 3 of the drawings.

Those skilled in the art will observe that when the movable blade 19 moves relative to the fixed blade 12 and between the changeable multiple cutting edge portions 37 and 38 respectively, as well as the elongated hardened cutting edge portion 36, it moves into a slot between the beams 18 of the fixed blade 12. The forward and rear ends of the slot are indicated by the letters S in the several Figures of the drawing.

It will thus be seen that the present invention relates to substantial improvements in the actual cutting and wearing edge portions of the metal cutting shears disclosed in the aforementioned U.S. Pat. Nos. 4,670,983 and 4,686,767 assigned to Allied Gator, Inc., Youngstown, Ohio, the assignee of the present invention.

The disclosure of U.S. Pat. Nos. 4,670,983 and 4,686,767 are incorporated herein by reference.

Although but one embodiment of the present invention has been illustrated and described, it will be apparent to those skilled in the art that various changes and modifications may be made therein without departing from the spirit of the invention and having thus described my invention, what I claim is:

1. An improvement in a shear for a backhoe having a boom with a controlled piston and cylinder assembly connected thereto, said shear having an elongated fixed cutting blade having a raised cutting edge portions and means for attaching said fixed cutting blade to said boom, said fixed cutting blade having horizontally spaced vertically positioned parallel beam portions and horizontal sections therebetween, a movable cutting blade having a plurality of cutting edge portions, means inwardly of a first end of said fixed cutting blade pivotally mounting said movable cutting blade therebetween in pivotal relation to said fixed cutting blade from an open position to a closed work piece shearing position and means for keeping the plurality of cutting edge portions of said movable cutting blade in shearing relation to said raised cutting edge portion of said fixed cutting blade through the entire extent of the shearing movement of the blades with respect to each other, said means for keeping the cutting edge portions of said movable cutting blade in shearing relation to said raised cutting edge portion of said fixed cutting blade comprising a slot in one of said horizontal sections of said fixed cutting blade and inwardly of said first end thereof and defining an elongated guide path, said slot being positioned and sized to receive and maintain said movable cutting blade and said plurality of cutting edge portions thereon in shearing relation to a work piece disposed between said blades; the improvement comprising said plurality of cutting edge portions of said movable cutting blade being positioned to form a continuous cutting edge and being removably affixed to said movable cutting blade, at least one of said plurality of cutting edge portions including a plurality of sides and at least two sharp cutting edges on at least two of its sides and being mounted on said movable cutting blade to be changeably positioned on said movable cutting blade to be moved from a position having a sharp cutting edge of one side aligned with the sharp cutting edges of the remainder of the cutting edge portions to another position having a sharp cutting edge of another side in alignment with those cutting edges of the remainder of said plurality of cutting edge portions and wherein one of said cutting edge portions is directly adjacent said means pivotally mounting said movable blade.

2. A device as recited in claim 1 and wherein at least one of said plurality of cutting edge portions has four equal sides and four right angles.

3. A device as recited in claim 1 and wherein each of said plurality of cutting edge portions are of a known thickness and height whereby their edges present a continuous sharp cutting edge and at least one of said plurality of said cutting edge portions has four equal edge sections and four right angles.

4. A device as recited in claim 1 and wherein said plurality of cutting edge portions are affixed to said movable cutting blade to form a continuous cutting edge and wherein a first cutting edge portion is directly adjacent to said means pivotally mounting said movable blade to said fixed blade, said first cutting edge portion being substantially less than the length of a second cutting edge portion adjacent thereto, said movable blade and first and second cutting edge portions being structured to urge a work piece being cut to move along said fixed cutting blade toward said means for pivotally mounting to generate an increased shearing force.

5. A device as recited in claim 1 and wherein at least one of said plurality of cutting edge portions is square in plan view and has eight right angular sharp edges.

6. A device as recited in claim 1 and wherein a plurality of wear plates are removably affixed to said fixed cutting blade on at least one of the beam portions thereof defining said slot for sliding registry with some of said cutting edge portions on said movable cutting blade.

7. A device as recited in claim 1 and wherein a plurality of wear plates are removably affixed to said fixed cutting blade on at least one of the beam portions thereof defining said slot for sliding registry with some of said cutting edge portions on said movable cutting blade, at least one of said plurality of wear plates being shaped to form at least one edge surface on at least one of its sides and adapted to be changeably positioned on said beam of said fixed cutting blade.

8. A device as recited in claim 1 and wherein a plurality of wear plates are removably affixed to said fixed cutting blade on at least one of the beam portions thereof defining said slot for sliding registry with some of said cutting edge portions on said movable cutting blade and wherein at least one of said plurality of wear plates has four equal sides and four angles.

9. An improvement in a shear for a backhoe having a boom with a controlled piston and cylinder assembly connected thereto, said shear having an elongated fixed cutting blade having a raised cutting edge portions and means for attaching said fixed cutting blade to said boom, said fixed cutting blade having horizontally spaced vertically positioned parallel beam portions and horizontal sections therebetween, a movable cutting blade having a plurality of cutting edge portions, means inwardly of a first end of said fixed cutting blade pivotally mounting said movable cutting blade therebetween in pivotal relation to said fixed cutting blade from an open position to a closed work piece shearing position and means for keeping the plurality of cutting edge portions of said movable cutting blade in shearing relation to said raised cutting edge portion of said fixed cutting blade through the entire extent of the shearing movement of the blades with respect to each other, said means for keeping the cutting edge portions of said movable cutting blade in shearing relation to said raised cutting edge portion of said fixed cutting blade comprising a slot in one of said horizontal sections of said fixed cutting blade and inwardly of said first end thereof and defining an elongated guide path, said slot being positioned and sized to receive and maintain said movable cutting blade and said plurality of cutting edge portions thereon in shearing relation to a work piece disposed between said blades; the improvement comprising said plurality of raised cutting edge portions of said fixed cutting blade being removably affixed thereto, at least one of said plurality of raised cutting edge portions including a plurality of sides and at least two sharp cutting edge portions on at least two of its sides and being mounted on said fixed cutting blade to be changeably positioned on said fixed cutting blade to be moved from a position having a sharp cutting edge of one side aligned with the sharp cutting edges of the remainder of the cutting edge portions to another position having a sharp cutting edge or another side in alignment with those cutting edges of the remainder of said plurality of cutting edge portions.

10. An improvement in a shear for a backhoe having a boom with a controlled piston and cylinder assembly connected thereto, said shear having an elongated fixed cutting blade having a raised cutting edge portions and means for attaching said fixed cutting blade to said boom, said fixed cutting blade having horizontally spaced vertically positioned parallel beam portions and horizontal sections therebetween, a movable cutting blade having a plurality of cutting edge portions, means inwardly of a first end of said fixed cutting blade pivotally mounting said movable cutting blade therebetween in pivotal relation to said fixed cutting blade from an open position to a closed work piece shearing position and means for keeping the plurality of cutting edge portions of said movable cutting blade in shearing relation of said raised cutting edge portions of said fixed cutting blade through the entire extent of the shearing movement of the blades with respect to each other, said means for keeping the cutting edge portions of said movable cutting blade in shearing relation to said raised cutting edge portions of said fixed cutting blade comprising a slot in one of said horizontal sections of said fixed cutting blade and inwardly of said first end thereof and defining an elongated guide path, said slot being positioned and sized to receive and maintain said movable cutting blade and said plurality of cutting edge portions thereon in shearing relation to a work piece disposed between said blades; the improvement comprising said plurality of raised cutting edge portions of said fixed cutting blade being removably affixed thereto, at least one of said plurality of raised cutting edge portions including a plurality of sides and at least two sharp cutting edges on at least two of its sides and being mounted on said fixed cutting blade to be changeably positioned on said fixed cutting blade to be moved from a position having a sharp cutting edge of one side aligned with the sharp cutting edges of the remainder of the cutting edge portions to another position having a sharp cutting edge of another side in alignment with those cutting edges of the remainder of said plurality of raised cutting edge portions and wherein said plurality of cutting edge portions on said movable cutting blade are removably affixed thereto, at least one of said plurality of cutting edge portions including a plurality of sides and at least two sharp cutting edge portions on at least two of its sides and being mounted on said movable cutting blade to be changeably position on said movable cutting blade to be moved from a position having a sharp cutting edge of one side aligned with the sharp cutting edges of the remainder of the cutting edge portions to another position having a sharp cutting edge of another side in alignment with the those cutting edge portions of remainder of said plurality of raised cutting edge portions on said movable cutting blade.

* * * * *